April 1, 1969 W. E. FLANNERY ET AL 3,436,742

THIN MAGNETIC FILM MEMORY OPERATING IN THE TIME LIMITED MODE

Filed Nov. 9, 1964

INVENTORS
WILLIAM E. FLANNERY
THOMAS J. MATCOVICH

BY Rene A. Kuypers
ATTORNEY

United States Patent Office 3,436,742
Patented Apr. 1, 1969

3,436,742

THIN MAGNETIC FILM MEMORY OPERATING IN THE TIME LIMITED MODE

William E. Flannery, Norristown, and Thomas J. Matcovich, Maple Glen, Pa., assignors to Sperry Rand Corporation, New York, N.Y., a corporation of Delaware Filed Nov. 9, 1964, Ser. No. 409,828
Int. Cl. G11b *5/06*
U.S. Cl. 340—174 20 Claims

ABSTRACT OF THE DISCLOSURE

This invention relates to a non-destructive thin film memory device having the property of uniaxial anisotropy which operates in a time limited mode. In the time limited technique of operation, a pulse is coupled to the film which causes the film's magnetization to coherently rotate. The applied pulse causes the film's magnetization to rotate to an angle removed from the easy axis which enables two restore forces to effectively return the magnetization to the easy axis, namely, the trapped flux field and the anisotropy field.

This invention relates in general to a magnetic storage element. In particular, the invention relates to a planar, non-destructive, thin film memory device.

A well-recognized shortcoming of prior art planar, thin film memory elements has been that they operate in a destructive read-out mode. This factor prevents a digital memory device, for example, from obtaining high cyclic speeds since a re-write or restore step must always follow a read-out operation. Thus, in accordance with the operation of a destructive read-out (referred to hereafter as DRO) memory, the memory element is first interrogated and then the information obtained during the interrogation is restored during a single word drive pulse. This is accomplished by a reading at the leading edge of the drive pulse and re-writing at the trailing edge thereof. As there is a need for digital devices that operate at higher speeds, there is a corresponding need for memory devices that operate at higher speeds. The DRO memory devices of the prior art do not satisfy the above-mentioned requirement.

A suggested technique for making a non-destructive read-out (referred to as NDRO), planar, thin film memory element is to read with a drive pulse of insufficient amplitude to pull the film's magnetic moment into the "hard" direction and to depend upon the anisotropy field to restore the magnetic moment to its original direction along the "easy" axis. This method results in a reduced output signal and relatively slow switching time in comparison to the proposed as well as the normal mode of operation, and is not desirable for use in high speed memory devices.

Accordingly, it is an object of this invention to provide a new and improved NDRO memory element.

It is another object of this invention to provide a new and improved planar, NDRO thin film memory element.

It is a further object of this invention to provide a new and improved planar, NDRO thin film memory element which achieves rapid switching speeds.

It is still a further object of this invention to provide a new and improved low power, NDRO memory element.

It is yet a further object of the instant invention to provide a new and improved NDRO planar, thin film memory element which has a relatively simple mode of operation.

It is a further object of this invention to provide a new and improved NDRO planar, thin film memory element which is relatively simple and economical to fabricate.

In accordance with a feature of this invention there is provided a NDRO planar, thin film memory element which is deposited on a thick ground plane. The thin film memory element is deposited on a ground plane in the presence of a D.C. field in order to establish in the film along the direction of the applied D.C. field a preferred direction of magnetization (i.e., an "easy" direction of magnetization). The thin film is interrogated during a read-out cycle with a drive pulse of negligible rise time and a time duration approximately equal to one-half the coherent switching time of the thin film element (typically, a few nanoseconds). The magnetic field produced by the drive pulse is approximately 2–3 $H_K$ (the anisotropy field) and causes the thin film's magnetic moment to be coherently rotated to an angle approximately equal to 60 degrees from the "easy" axis of magnetization.

After the film's magnetic moment has been initially rotated to the above-mentioned angle and at the termination of the word field, two restoring fields influence the magnetic moment to return to its original rest position along the "easy" axis. The first restore field consists of a fractional portion of the anisotropy field $H_K$ (i.e., the field which is along the "easy" axis). The second restore field consists of the magnetic field produced by eddy currents which develop in the thick ground plane conductor surrounding the thin film element (hereinafter referred to as the trapped flux field) during the rotation of the magnetic moment toward the "hard" axis. In other words, the trapped flux field and the anisotropy field actually oppose the initial rotation of the film's magnetic moment toward the "hard" direction of the magnetization and hence, tend to restore the moment into its original position along the "easy" axis after the drive field has been terminated.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawing, wherein:

FIGURE 1(*a*) shows the output signal produced by such a prior art planar, DRO thin magnetic film switched through 90° by the drive pulse of FIGURE 1 and the film's coherent switching time is designated as $t$. FIGURE 1(*a*) also indicates the "0" and "1" re-write drive pulses;

Figure 2:
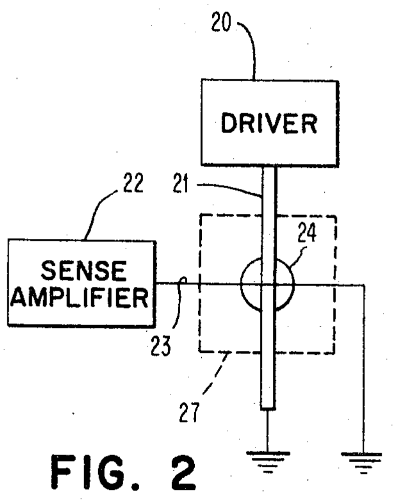
FIGURE 2 represents a NDRO thin film memory element plated on a thick ground plane in accordance with this invention.
Figure 2A:
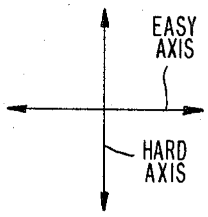

FIGURE 2(*a*) indicates the "easy" and "hard" direction of magnetization for the memory element of FIGURE 2.

Figures 1, 1A, 3, 4, 5:
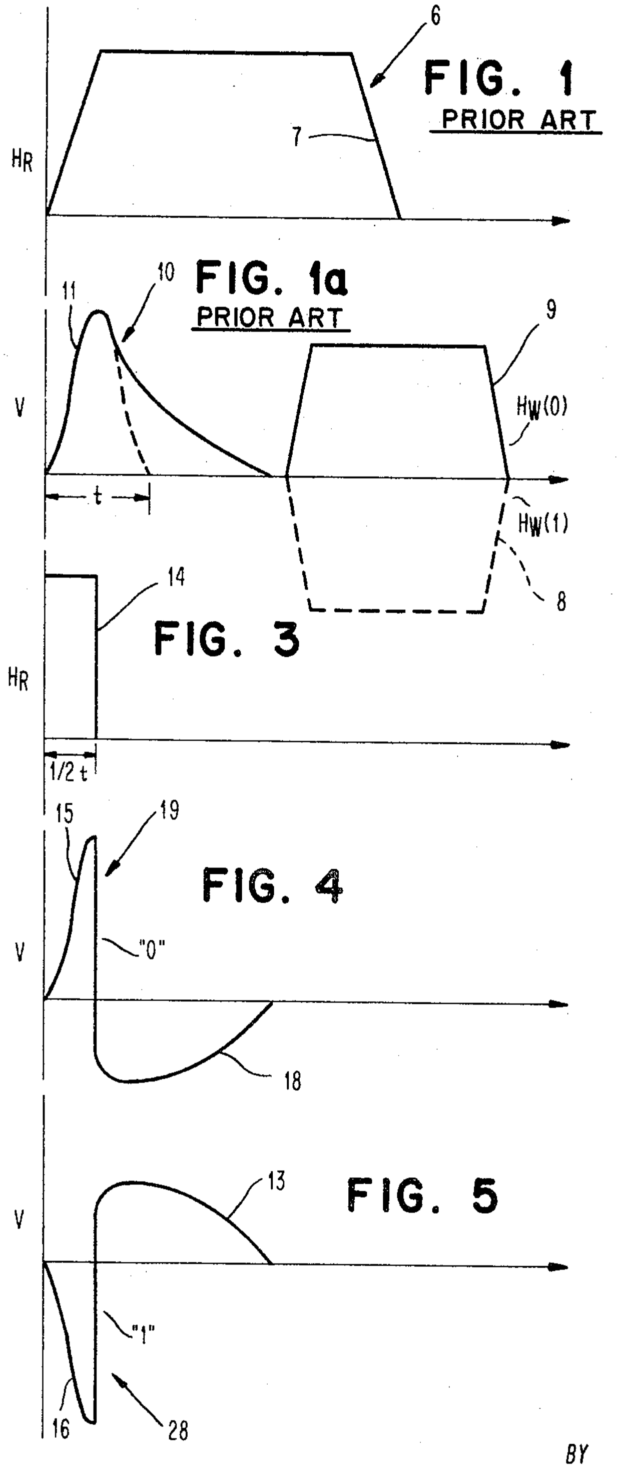
FIGURE 1 depicts a typical prior art drive pulse required to read-out information stored in a DRO memory element.

FIGURE 3 is the drive pulse applied to the thin film element of FIGURE 2 which has a time duration approximately equal to one-half the coherent switching time of the thin film;

FIGURE 4 is the output signal derived from the NDRO, thin film memory element of FIGURE 2 which is magnetized in a first direction along the "easy" axis of magnetization;

FIGURE 5 is the output signal derived from the NDRO, thin film memory element of FIGURE 2 which is magnetized in a second direction along the "easy" axis of magnetization;

Referring to FIGURES 1 and 1(*a*), the operation of a prior art DRO planar thin film element reading cycle may be observed. Thus, reading or interrogation of a memory element is accomplished by applying the drive pulse 6 of FIGURE 1 to a conventional drive line. A current usually on the order of a few hundred milliamperes generates a traverse field ($H_R$) several times greater than the film's anisotropy field ($H_K$) and as a result, the film's magnetic moment is rotated through 90 degrees from the "easy" or preferred axis of magnetization. The rotation of the magnetic moment induces a signal 10 in a sense line and such a signal is depicted in FIGURE 1(*a*). The polarity of the output signal serves as identification of the stored information; in other words, a "zero" signal resulting from a counter-clockwise rotation of the magnetic moment has a polarity opposite to that of a "one" signal generated by a clockwise rotation. The signal 10 represents a "zero" output produced by counter-clockwise rotation.

If the drive pulse 6 of FIGURE 1 were terminated after initially rotating the magnetization to approximately 90 degrees, there would be destruction of the information stored in a thin film memory element. This results from the fact that the magnetic moment becomes incoherent (i.e., forms a multitude of small domains and the film becomes demagnetized). In order to overcome the above-mentioned demagnization, a re-write or steering pulse (i.e., either pulse 8 or 9) is applied to a bit line at the trailing edge 7 of the drive pulse 6. The effect of the steering pulse 8 or 9 in conjunction with the drive pulse is to re-orient the magnetization to the desired remanent state (i.e., the remanent state before the read cycle began). The front portion 11 of the pulse 10 is caused by coherent rotation of the magnetic moment whereas the portion 12 is caused by domain wall motion due to the breaking up of the magnetization into small domains as mentioned above. This is often referred to as coherent rotation. As is well known, rotation by domain wall motion is relatively slow since it is a sequential operation, that is, domains grow at the expense of other domains. This is to be contrasted with coherent rotation which is one to two orders of magnitude faster than that of domain wall motion because the magnetization takes place by the simultaneous rotation of the magnetic moments of the thin film. The time coordinate of FIGURE 1(*a*) indicates that the time to accomplish a complete 90 degree switch by coherent rotation is *t*. The time *t* is normally in the range from 1–10 nanoseconds.

In order to eliminate the DRO characteristics of the prior art, the instant invention provides a NDRO thin film element as shown in FIGURE 2. The planar, thin film element 24 is deposited on a thick metallic ground plane 27 by well known techniques such as electroplating or vacuum deposition. The thin film spot 24 is approximately 10 mils in diameter, 500 Angstroms thick and is made of Permalloy (nickel-iron alloy). The thin film spot 24 is deposited on the ground plane 27 in the presence of a properly oriented field so the film acquires the property of uniaxial anisotropy. The uniaxial anisotropy causes the thin film spot 24 to acquire an "easy" and "hard" direction of magnetization as illustrated in FIGURE 2(*a*).

A current pulse 14 (FIGURE 3) is generated by the driver 20 (FIGURE 2) and has a time duration, in a preferred embodiment, approximately equal to one-half the coherent switching time of the thin film element. In other words, the pulse 14 has a time duration equal to one-half the time required to coherently switch a prior art thin film through 90 degrees. It should be noted that the time duration of the current pulse can be somewhat lower or higher than one-half the coherent switching time and still operate within the spirit of this invention. Thus, by way of example, the pulse duration may be .1 or .9 of the coherent switching time. In a particular embodiment and for illustrative purposes only, the pulse 14 may incorporate the following characteristics:

| | |
|---|---|
| Rise time to 50 ma. | Less than 1 nanosecond. |
| Minimum pulse amplitude and duration | 50 ma. for 1 nanosecond. |
| Fall time | Equal to or less than 2 nanoseconds. |
| Pulse width at base | 2–5 nanoseconds. |

The short duration, negligible rise and fall time pulse 14 causes the film's magnetization or magnetic moment to be coherently but incompletely (i.e., as opposed to a complete 90 degree rotation of FIGURE 1(*a*) switched from the "easy" toward the "hard" axis of magnetization through an angle of approximately 60 degrees. Thus, the rise time of the pulse 14 is so rapid that the domains of the thin film spot 24 (FIGURE 2) are almost instantaneously rotated into alignment with the applied $H_R$ field. In other words, coherent rotation takes place because the rise time of the drive pulse passes very quickly through the threshold region wherein domain wall rotation takes place. As mentioned above, coherent rotation is several orders of magnitude faster than domain wall rotation. The coherent rotation of the thin film's magnetization induces a positive voltage 19 or negative voltage 28 (FIGURES 4 and 5, respectively) in the sense line 23 (FIGURE 2) depending upon whether a binary "zero" or "one" is recorded therein. The voltages 19 and 28 induced in the sense line 23 are detected in the sense amplifier 22.

After the film's magnetic moment is rotated to the approximate 60 degree angle, the current pulse is terminated. Thereafter, two fields tend to restore the magnetic moment to its origianl position along the "easy" axis. The first restoring field is the trapped flux field which is generated by eddy current circulating in the thick ground plane 27 (FIGURE 2) under the film element 24. An eddy current may be defined as an induced current circulating within a mass of metal. These eddy currents are a result of Lenz's law, which states that the direction of current induced in a circuit as a result of a change in the interlinkage between the circuit and a magnetic field is such as to oppose the change of interlinkage. Thus, a field is generated in the thick ground plane to oppose the change of field produced by the rotation of the magnetic moment (i.e., the rotation from "easy" to the "hard" axis). The trapped flux field, therefore, is in a direction required to produce NDRO operations. The value of the trapped flux field is of the order of 1.5 oersteds for a Permalloy film having the physical characteristics of this invention.

The second restoring field that contributes to the NDRO characteristic of the planar, thin film memory element 24 of FIGURE 2 is called the anisotropy field ($H_K$). As mentioned briefly above, the thin film 24 (FIGURE 2) has the property of uniaxial anisotropy in that the magnetization has a preferred orientation along the "easy" axis and resists any change thereto. In the usual DRO element memory operation, the magnetic moment is brought into the "hard" direction (i.e., rotated through 90 degrees) and then released. The anisotropy field which has a magnitude of $H_K \cos \theta$ ($\theta$ is the angle between the magnetic moment and the "easy" axis) has no initial effect upon tipping the magnetic moment back into its original position since the cosine of 90 degrees is zero and hence $H_K \cos \theta$ equals zero. Therefore, the film's anisotropy does not contribute to the initial restore field. However, since the film's magnetic moment in the instant invention is rotated through an angle of approximately 60 degrees, the restore force is equal to $H_K/2$.

The trapped flux field and the anisotropy field exert a combined restoring force at approximately 2–3 oersteds. This is to be contrasted with the initial rotating field produced by the current pulse 14 of FIGURE 3 which is approximately 4 to 5 oersteds. This difference in field magnitudes accounts for the difference in the shape in FIG- URES 4 and 5 of the positive and negative portions of the output signal. In other words the magnetic moment of a thin film element is rotated to the 60 degree position more rapidly than it is rotated back to its rest position along the "easy" axis. However, the positive and negative portions of the output signal 19, for example, embrace the same total area.

In an actual memory embodiment, only the positive portion 15 of the pulse 19 and the negative portion 16 of the pulse 28 would be utilized to differentiate between a "zero" and a "one." Therefore, the negative portion 18 and the positive portion 13 of the pulses 19 and 28 would not be utilized and would be ignored by appropriately connected electronic circuitry (not shown).

The NDRO planar, thin film memory element, as described in this invention, develops rapid switching speeds in view of the rapid rotation of the magnetic moment by the relatively high amplitude, short duration drive pulse. This factor, together with the NDRO characteristics of the thin film element, accounts for a material decrease in memory cycle time (i.e., the time required for successive read operations). This is significant in that in many digital computer systems a memory read operation is performed more often than the write operation.

It should be also noted that the rapid rotation of the film's magnetic moment by the relatively high amplitude, short duration drive pulse accounts for the increased voltage output over prior art methods. This can be shown mathematically as follows:

The voltage output of a thin film element is $$V=d\phi/dt \qquad (1)$$

but, $$\frac{d\phi}{dt}=4\pi A\frac{dM}{dt} \qquad (2)$$

where A is the cross sectional area of the thin film element and $dM/dt$ is the rate of change of speed of rotation of the film magnetic moment.

Substituting 2 in 1 above, the following equation is obtained, $$V=-4\pi A\frac{dM}{dt} \qquad (3)$$

Therefore, the voltage output is greater if $dM/dt$ is greater. However, $dM/dt$ is made greater by making the magnetizing force, H, greater. The magnetizing force, H, is made greater by the short duration, high amplitude pulse of the instant invention.

The NDRO planar, thin film memory element of this invention is also characterized by low power consumption because of the low impedance of the drive line. Thus, typical operating characteristics at which the drive line is energized during a read-write cycle are 50–100 milliamperes at 200 millivolts.

It can be readily appreciated that the NDRO thin film element as described above has a simple mode of operation and furthermore, it can be easily fabricated in volume by batch processes.

It should be understood that a write cycle for the NDRO memory device of the instant invention is accomplished by conventional techniques. Thus, in accordance with one such technique the drive pulse 14 (FIGURE 3) is applied to the drive line 21 by the driver 20 of FIGURE 2. Coincidentally with the drive pulse 14, a steering pulse of proper polarity is applied by a bit driver (not shown) to a drive line (not shown) contiguous to the sense line 23.

While the embodiment of the thin film memory device above described has been with respect to a metallic ground plane, it should be understood that it is also feasible to practice this invention by utilizing a non-metallic ground plane. The trapped flux field in such an embodiment would result from eddy currents which circulate in the word lines, the sense or bit lines, as well as other copper conductors.

In view of the above description, it is now possible to bring into focus the distinctions between applicants' NDRO technique and those of the prior art, discussed beginning in column 1 of the subject specification. In the first instance, the known prior art operates by applying an amplitude limited pulse to a thin film element, whereas applicants apply a time limited pulse to the same film element. In other words, the prior art drive field is limited to approximately ½ $H_K$ for a 60 degree rotation of the magnetic moment. The applicants are not so limited and can apply a field several times $H_K$. In view of this distinction, the prior art cannot achieve the rapid rotation of the thin film's magnetic moment and further, cannot develop the high voltage output of the instant invention.

The time limited technique of the present invention produces the following further improvement: in amplitude limited switching, the magnetic moment may break up into domains, whereas in the present invention, rotation of the magnetic moment will always be coherent. Further, in the prior art technique, the trapperd flux field will have decayed after the driving field has been terminated so that it is ineffective as a restoring force. On the other hand, by limiting the duration of the drive pulse as provided by this invention, the eddy currents will not have decayed to a significant degree after the driving field is terminated and are therefore effective in restoring the magnetic moment to its rest position along the "easy" axis.

In summary, this invention provides a planar, thin film storage element which has NDRO characteristics. The NDRO characteristics of this thin film memory element are achieved by interrogating a planar, thin film element by means of a relatively high amplitude drive pulse having a rapid rise time and a pulse duration which is approximately one-half the coherent switching time of the thin film memory element. By interrogating the memory element with this type of pulse, a magnetic field is generated which causes the magnetic moment of the film along the "easy" axis to be rapidly rotated to an angle of approximately 60 degrees. At the termination of the word field two restoring forces return the magnetic moment to its former remanent state. The first restoring field consists of a fractional portion of the anisotropy field ($H_K$). The second restoring force which acts upon the magnetic moment is the trapped flux field. This field is generated in accordance with Lenz's law and is in a direction to oppose the original rotation of the moment. The origin of this field is the eddy currents which develop in the thick ground plane surrounding the film element.

Obviously, many modifications and variations to the present invention are possible in the light of the above teaching. It is therefore, to be understood, that within the scope of the appended claims, the invention may be practiced otherwise than as specifically described.

The embodiments of the invention in which an exclusive property or privilege is claimed are defined as follows:

1. A storage element comprising: a ferromagnetic thin film formed on a substrate, said thin film characterized by an easy and hard axis of magnetization and an anisotropy field, $H_K$, said thin film having a magnetic moment lying along said easy axis of magnetization; means coupled to said thin film to switch said magnetic moment from said easy toward said hard axis of magnetization in response to a magnetic field which is more than $H_K$, said magnetic field having a time duration which is approximately equal to one-half the time required to coherently switch said thin film.

2. A storage element comprising: a ferromagnetic thin film formed on a substrate, said thin film characterized by an easy and hard axis of magnetization and an anisotropy field, $H_K$, said thin film having a magnetic moment lying along said easy axis of magnetization; means coupled to said thin film to incompletely switch said magnetic moment from said easy toward said hard axis of magnetization in response to a magnetic field, said field having a time duration which is approximately equal to one-half the time required to coherently switch said thin film.

3. A non-destructive storage element comprising: a ferromagnetic thin film formed on a substrate, said thin film characterized by an easy and hard axis of magnetization, said thin film having a magnetic moment lying along said easy axis of magnetization; means coupled to said thin film to switch said magnetic moment from said easy toward said hard axis of magnetization to an approximate 60 degree angle in a period of time to allow a magnetic returning force to be generated which restores said magnetic moment to a rest position along said easy axis.

4. A storage element comprising: a ferromagnetic thin film formed on a substrate, said thin film characterized by an easy and hard axis of magnetization and an anisotropy field, $H_K$, said thin film having a magnetic moment lying along said easy axis of magnetization; means coupled to said thin film to switch said magnetic moment from said easy toward said hard axis of magnetization in response to a current pulse which produces a field greater than $H_K$, said pulse having a time duration which is approximately equal to one-half the time required to coherently switch said thin film.

5. A non-destructive storage element comprising: a ferromagnetic thin film formed on a substrate, said thin film characterized by an easy and hard axis of magnetization and an anisotropy field, $H_K$, said thin film having a magnetic moment lying along said easy axis of magnetization; means coupled to said thin film to switch said magnetic moment to an angle of approximately 60 degrees from said easy to said hard axis of magnetization in response to a magnetic field which is more than $H_K$, said magnetic field being generated by a signal having a time duration which is approximately equal to one-half the time required to coherently switch said thin film.

6. A storage element comprising: a ferromagnetic thin film formed on a substrate, said thin film characterized by an easy and hard axis of magnetization and an anisotropy field, $H_K$, said thin film having a magnetic moment lying along said easy axis of magnetization; signal means coupled to said thin film to switch said magnetic moment from said easy toward said hard axis of magnetization in response to a magnetic field which is more than $H_K$, said signal means having a time duration in a range approximately equal to .1 to .9 the time required to coherently switch said thin film.

7. A non-destructive storage element comprising: a ferromagnetic thin film formed on a substrate, said thin film characterized by an easy and hard axis of magnetization and an anisotropy field, $H_K$, said thin film having a magnetic moment lying along said easy axis of magnetization; means coupled to said thin film to switch said magnetic moment from said easy toward said hard axis of magnetization in response to a magnetic field, which is more than $H_K$, in a period of time to allow a magnetic restore force to be generated in opposition to said magnetic moment's rotation to return said magnetic moment to a rest position along said easy axis.

8. A non-destructive storage element comprising: a ferromagnetic thin film formed on a substrate, said thin film characterized by an easy and hard axis of magnetization and an anisotropy field, $H_K$, said thin film having a magnetic moment lying along said easy axis of magnetization; means coupled to said thin film to switch said magnetic moment to an angle of approximately 60 degrees from said easy axis in a period of time to allow a magnetic restoring field, generated in opposition to said magnetic moment rotation, to restore said magnetic moment to a rest position along said easy axis.

9. A non-destructive storage element comprising: a ferromagnetic thin film formed on a ground plane, said thin film characterized by an easy and hard axis of magnetization, said thin film having a magnetic moment lying along said easy axis of magnetization; means coupled to said thin film to switch said magnetic moment from said easy toward said hard axis of magnetization to an approximate angle of 60 degrees in a period of time to allow a magnetic restoring force generated partially in said ground plane and partially in said film in opposition to said magnetic moment's rotation, to return said magnetic moment to a rest position along said easy axis.

10. A non-destructive storage element comprising: a ferromagnetic thin film formed on a ground plane, said thin film characterized by an easy and hard axis of magnetization and an anisotropy field, $H_K$, said thin film having a magnetic moment lying along said easy axis of magnetization; means coupled to said thin film to switch said magnetic moment from said easy toward said hard axis of magnetization in response to a magnetic field which is more than $H_K$, said magnetic field having a time duration which is approximately equal to one-half the time required to coherently switch said thin film.

11. A non-destructive storage element comprising: a ferromagnetic thin film formed on a substrate, said thin film characterized by an easy and hard axis of magnetization and an anisotropy field, $H_K$, said thin film having a magnetic moment lying along said easy axis of magnetization; means coupled to said thin film to switch said magnetic moment from said easy toward said hard axis of magnetization in response to a magnetic field which is more than $H_K$, said magnetic field having a time duration which is approximately equal to one-half the time required to coherently switch said thin film; two magnetic field restoring force means returning said magnetic moment to a rest position along said easy axis of magnetization after being rotated.

12. A storage element comprising: a ferromagnetic film formed on a ground plane, said thin film characterized by an easy and hard axis of magnetization and an anisotropy field, $H_K$, said thin film having a magnetic moment lying along said easy axis of magnetization; means coupled to said thin film to switch said magnetic moment from said easy toward said hard axis of magnetization in response to a magnetic field which is more than $H_K$, said magnetic field being produced by a signal having a time duration which is approximately equal to one-half the time required to coherently switch said thin film such that first and second restore forces are generated to return said magnetic moment to a rest position along said easy axis of magnetization, after being rotated by said magnetic field.

13. A non-destructive storage element comprising: a ferromagnetic film formed on a ground plane, said thin film characterized by an easy and hard axis of magnetization and an anisotropy field, $H_K$, said thin film having a magnetic moment lying along said easy axis of magnetization; means coupled to said thin film to switch said magnetic moment from said easy toward said hard axis of magnetization in response to a magnetic field which is more than $H_K$, said magnetic field having a time duration which is approximately equal to one-half the time required to coherently switch said thin film such that first and second restore forces are generated to return said moment to the easy axis comprising respectively a magnetic field generated by eddy currents in said ground plane and a portion of said thin film's anisotropy field, $H_K$.

14. A non-destructive storage element comprising: a ferromagnetic film formed on a ground plane, said thin film characterized by an easy and hard axis of magnetization and an anisotropy field, $H_K$, said thin film having a magnetic moment lying along said easy axis of magnetization; means coupled to said thin film to switch said magnetic moment to an angle of approximately 60 degrees from said easy axis of magnetization in response to a magnetic field which is more than $H_K$, said magnetic field having a time duration which is approximately equal to one-half the time required to coherently switch said thin film; a first means comprising a magnetic field generated by eddy currents in said ground plane restoring said magnetic moment to a rest position along said easy axis; a second means comprising a portion of said thin film's anisotropy field, $H_K$, restoring said magnetic moment to a rest position along said easy axis.

15. A non-destructive storage element comprising: a ferromagnetic film formed on a ground plane, said thin film characterized by an easy and hard axis of magnetization with an anisotropy field, $H_K$, said thin film having a magnetic moment lying along said easy axis of magnetization; means coupled to said thin film to switch said magnetic moment from said easy toward said hard axis of magnetization in response to a magnetic field which is greater than $H_K$, said magnetic field having a time duration which is approximately equal to one-half the time required to coherently switch said thin film such that first and second restore forces are generated to return said moment to the easy axis and comprising respectively a magnetic field generated by eddy currents in said ground plane and a magnetic field approximately equal to $H_K/2$.

16. A non-destructive memory element comprising: a ferromagnetic element formed on a substrate, said thin film having two states of stable remanence representing first and second recorded signals and characterized by an easy and hard axis of magnetization and an anisotropy field, $H_K$, said thin film having a magnetic moment lying along said easy axis of magnetization; sense means coupled to said element; means further coupled to said element to switch said magnetic moment from said easy to hard axis of magnetization in response to a field which is greater than $H_K$, said field having a time duration which is approximately equal to one-half the time required to coherently switch said thin film, said sense means thereby determining whether said first or second signal is recorded by said element.

17. A non-destructive storage element comprising: a metallic substrate member upon which is deposited a thin magnetic film which has the property of uniaxial anisotropy such that a magnetic moment lies along an easy axis of magnetization and a hard axis is located 90 degrees therefrom; a metallic drive line juxtaposed to said film so that its longitudinal axis lies along said easy axis; means to energize said drive line with a short duration pulse thereby rotating said magnetic moment to an angle of approximately 60 degrees from said easy axis of magnetization, a first restore force comprising the eddy currents produced in said metallic members and a second restore force comprising said anisotropy field returning said moment to the easy axis.

18. A non-destructive storage element comprising: a metallic substrate member upon which is deposited a thin magnetic film which has the property of uniaxial anisotropy such that a magnetic moment lies along an easy axis of magnetization and a hard axis is located 90 degrees therefrom; a metallic drive line juxtaposed to said film so that its longitudinal axis lies along said easy axis; means to energize said drive line with a pulse having a duration on the order of 2–5 nanoseconds so that said magnetic moment is rotated to an angle which is within the restoring force of the trapped flux within said metallic members as well as the film's anisotropy field.

19. A non-destructive storage element comprising a metallic substrate member upon which is deposited a thin magnetic film which has the property of uniaxial anisotropy such that a magnetic moment lies along an easy axis of magnetization and a hard axis is located 90 degrees therefrom; a metallic drive line juxtaposed to said film so that its longitudinal axis lies along said easy axis; means to energize said drive line with a pulse having a duration on the order of 2–5 nanoseconds so that said magnetic moment is rotated to an angle which is within the restoring force of the trapped flux within said metallic members as well as approximately ½ of the film's anisotropy field.

20. A non-destructive storage element comprising: a metallic substrate member upon which is deposited a thin magnetic film which has the property of uniaxial anisotropy such that the magnetization lies along an easy axis of magnetization and a hard axis is located 90 degrees therefrom; a metallic drive line juxtaposed to said film so that its longitudinal axis lies along said axis; means to energize said drive line with a short duration pulse thereby rotating said magnetization to an angle $\leq 60$ from said easy axis of magnetization, a first restore force comprising metallic members and a second restore force comprising said anisotropy field $\geq H_K/2$ returning said magnetization to the easy axis.

References Cited

UNITED STATES PATENTS

| | | | |
|---|---|---|---|
| 3,092,812 | 6/1963 | Rossing et al. | 340—174 |
| 3,159,821 | 12/1964 | Rossing | 340—174 |
| 3,304,543 | 2/1967 | Louis et al. | 340—174 |

OTHER REFERENCES

Hershberg, P. I., "Ferromagnetic Domains," Electro-Technology, January 1962, pp. 71–82.

TERRELL W. FEARS, *Primary Examiner.*

JOSEPH F. BREIMAYER, *Assistant Examiner.*